United States Patent Office 3,498,581
Patented Mar. 3, 1970

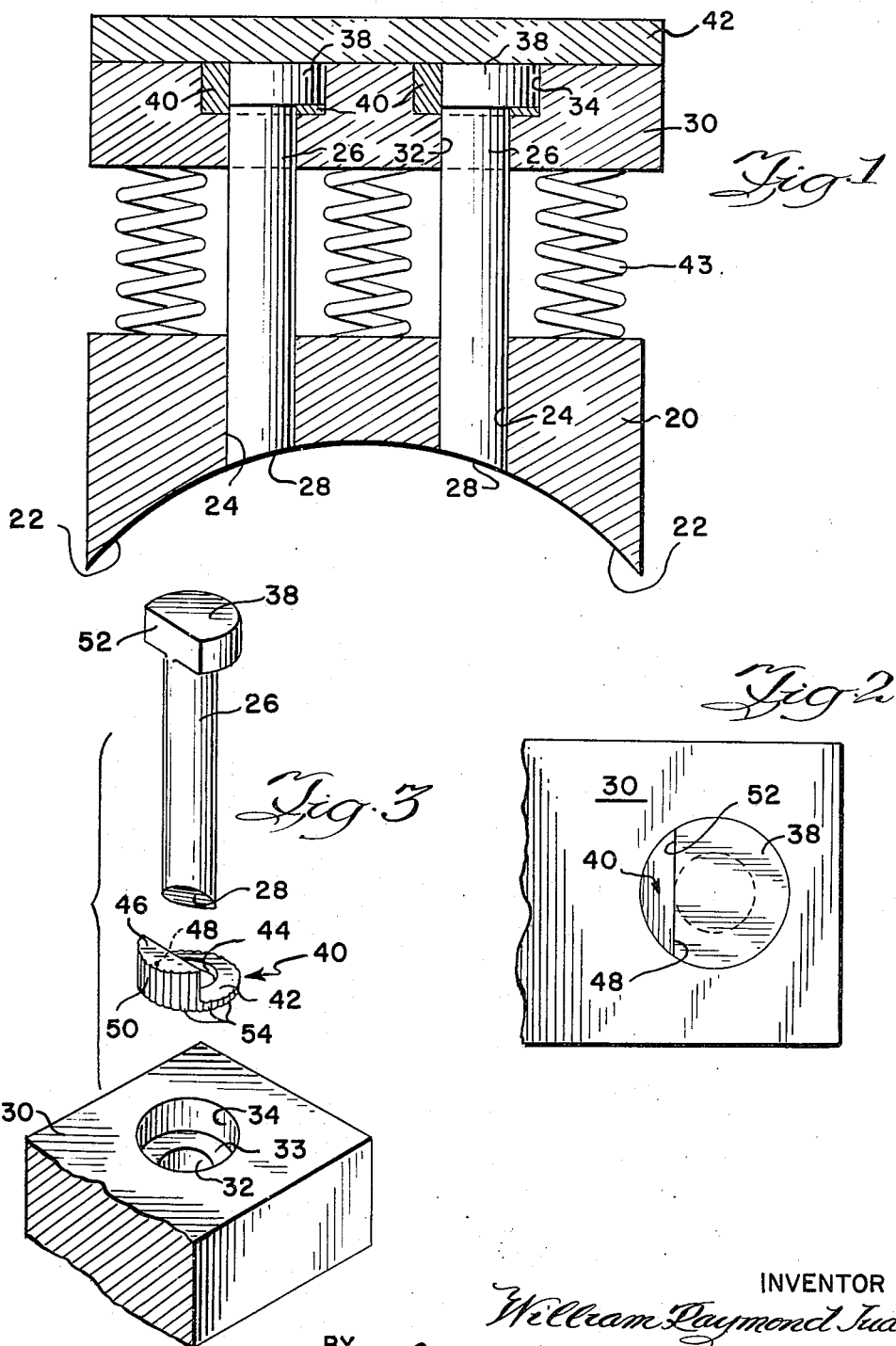

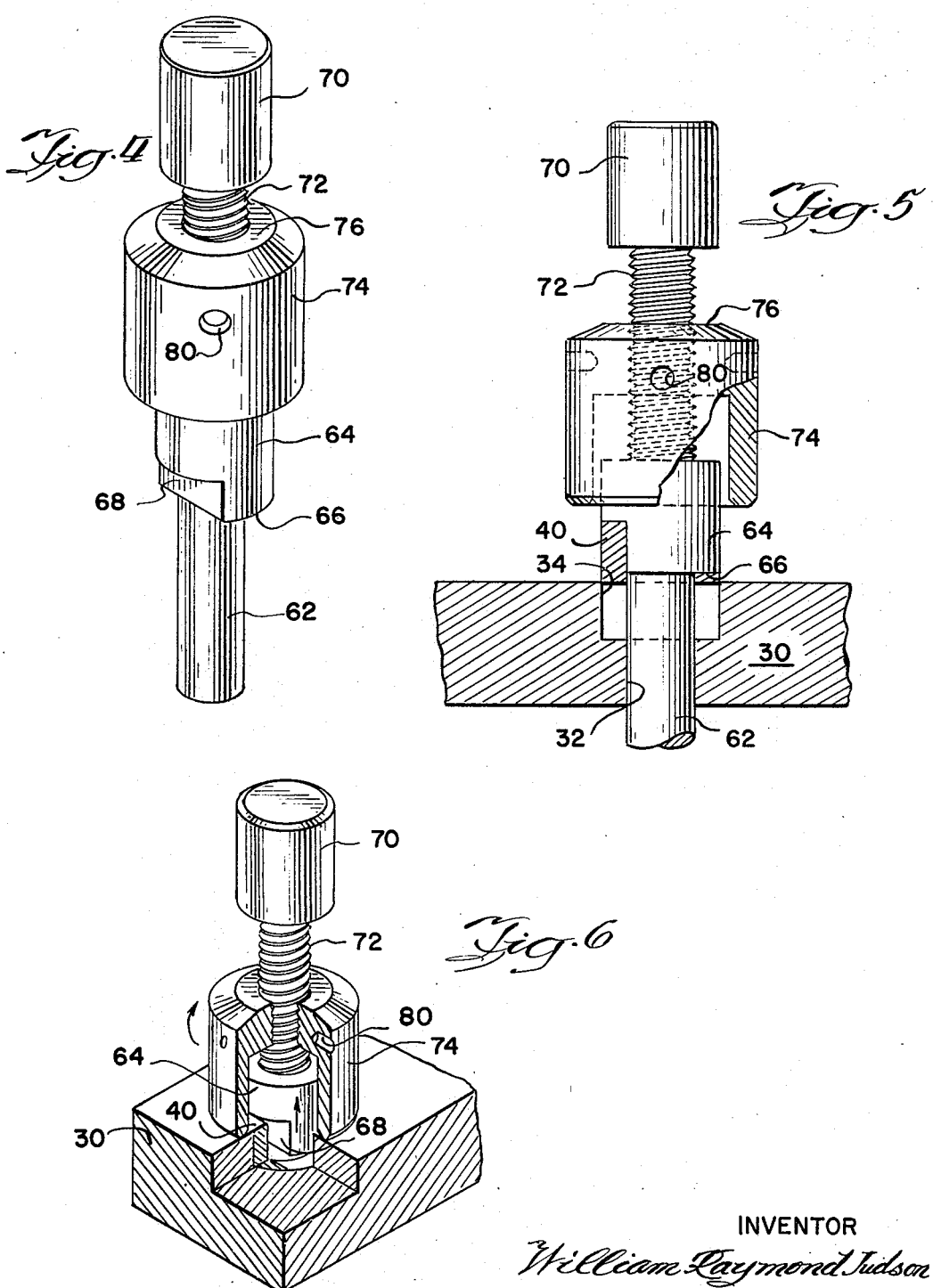

3,498,581
POSITIONING DEVICE FOR CORE PINS
William Raymond Judson, 242 N. Central Ave.,
Chicago, Ill. 60604
Filed June 14, 1967, Ser. No. 646,111
Int. Cl. B28b 7/10; F16b 3/00
U.S. Cl. 249—67
6 Claims

ABSTRACT OF THE DISCLOSURE

A positioning insert for disposition in a counterbored core pin receiving passageway in a core-pin plate. The insert being formed with a relatively thin annular disc-like portion having an outer diameter and an inner diameter corresponding to the diameters of the counterbore and the passageway, respectively. An axially extending projection on the insert having a flat surface thereon providing an abutment surface for cooperation with a like abutment surface formed on a core pin to fix the rotative position of the core pin relative to the core-pin plate. A tool for properly positioning the insert in the counterbored core pin receiving passageway.

BACKGROUND OF INVENTION

The invention relates generally to the production of molds, and more particularly, to the provision of an insert for use with a core-pin plate to fix the rotative position of the core pin with respect to the plate.

In the molding operation, after the molded article has been formed and has cooled sufficiently, it is the normal practice to provide pins which move relative to the mold cavity to engage and eject the molded article from the mold cavity. The mold body is formed with a plurality of passageways leading into the mold cavity in which these core or ejector pins are disposed. Since these pins form an integral part of the mold itself and in effect define a portion of the mold cavity, it is necessary that the ends or tips thereof be machined to exactly conform to the desired shape of the mold cavity. However, since it is rarely possible to position the core pins in the generally flat sections of the mold, out of necessity the pins must be provided with tapered or contoured end surfaces. Accordingly, it is essential to the production of uniform molded parts that the core or ejector pins be precisely positioned with respect to the adjacent wall portions. It can be readily appreciated that if the core or ejector pin or core or ejector pins are mounted with their rotative position somewhat out of alignment, the end surfaces thereof will not conform to the surface of the mold cavity and the final product will be adversely affected.

Standard practice is to utilize a core-pin or ejector pin plate which carries the core or ejector pains and is mounted for reciprocal movement relative to the mold body, which correspondingly causes the core pins to move relative to the mold cavity and effect ejection of the molded article. In addition, with this type of arrangement since the position of the core pin plate relative to the mold body is predetermined, it is the general practice to define the proper position of the core pins relative to the mold cavity by fixing or keying the core pins to the core-pin plate.

Prior art practices include two general methods of properly keying the core pins to the core-pin plate. One method utilizes set screws which are disposed in threaded apertures formed in the core-pin plate and engage the core pins to fix their position relative to the plate. Another method, to which this invention is related, is to provide core pins with enlarged headed portions that have flats or abument surfaces milled thereon. The core pin receiving passageways in the core-pin plate are also provided with milled flats or abutment surfaces that correspond to and engage those on the headed core pins. This latter method, prior to the present invention, necessitated rather complicated and time consuming milling procedures.

The aforementioned practices or procedures are workable, but when it is realized that a mold may often employ thirty-six (36) or more core pins, it is apparent that the time required to effect proper keying of the core pins to the core-pin plate contributes significantly to the overall cost of the mold.

SUMMARY OF THE INVENTION

Accordingly, it is a primary object of the invention to provide a core or ejector pin positioning insert adapted to be disposed in a counterbored portion of a core or ejector pin receiving passageway and thereby materially reduce the time required to properly key core pins to the core-pin plate.

A further object of the invention is to provide an insert that is fixedly positioned in a counterbored passageway to provide an abutment surface against which a like abutment surface formed on the head of a core pin can be disposed to effect the proper positioning of the core pin relative to the core-pin plate and prevent relative rotation therebetween after the core pin is positioned.

Other objects and advantages of the invention will occur to those skilled in the art as the description thereof is evolved hereinafter.

DESCRIPTION OF THE DRAWINGS

FIG. 1 is a schematic sectional view of the environment in which the invention is practiced and illustrates a core-pin plate mounted relative to a portion of the mold body and having the core pins positioned in the counterbored passageways with the core pin positioning inserts of the present invention secured in said counterbores to fix the position of said core pins; the core pins being illustrated in elevation.

FIG. 2 is a partial, top plan view of the core-pin plate of FIG. 1 with the cover removed and illustrating the relationship between the abutment surface on the insert and the abutment surface on the headed core pin.

FIG. 3 is an exploded perspective of the headed core pin, the core-pin positioning insert and the counterbored core-pin plate.

FIG. 4 is a perspective view of a tool used to secure the core-pin positioning insert in the counterbored portions of the core-pin plate.

FIG. 5 is a partial sectional view of the core-pin plate and the insert prior to disposition of the insert in the counterbored portion of said plate, and further illustrating how the tool of FIG. 4 is used to secure the insert in the counterbored portion; the tool being illustrated in elevation with the threaded collar partially broken away.

FIG. 6 is a perspective view, with a portion of the core-pin plate, the insert and the threaded collar on the tool broken away, and illustrating how the threaded collar is used to effect removal of the tool.

DESCRIPTION OF DISCLOSED EMBODIMENT

Referring to the drawings, FIG. 1 is a schematic illustration of the environment in which the invention is used, wherein the mold body is designated 20, and the inner surface of the mold cavity is designated 22. In the mold body 20 there are provided a plurality of core-pin receiving bores 24 which have the core or ejector pins 26 disposed therein. As illustrated, the ends 28 of the core or ejector pins are machined to precisely conform to the shape of the inner surface 22 of the mold cavity.

FIG. 1 further schematically illustrates the mounting arrangement for the core pins 26 which provide for the reciprocal movement of said core pins relative to the mold cavity. Core pins 26 are mounted to a core-pin or ejector-pin plate 30 which is provided with a plurality of core pin receiving passageways 32 aligned with the bores 24 in the mold body. The uppermost portion of each passageway 32 is provided with a counterbore 34 which receives the enlarged headed portion 38 of the core pin. As will be more fully detailed hereinafter, there is provided an insert 40 fixedly secured in the counterbore 34 which is effective to positively fix the rotative position of the core pin 26 with respect to both the core pin plate 30, the mold body 20 and the surface of the mold cavity 22.

The core-pin plate 30 carries a cover plate 42 which overlies the enlarged headed portions 38 of the core pins 26 to rigidly affix the core pins in their respective counterbores 34.

The core-pin plate 30 is spaced from the mold body 20 and is adapted for reciprocal movement relative thereto by the utilization of a plurality of springs 43. Accordingly, when it is desired to remove the molded article from the mold cavity 22, movement of the core-pin plate 30 inwardly toward the mold body will cause the core pins 26 to enter the mold cavity and thereby forcibly eject the molded articles therefrom. Springs 43 tend to urge the core-pin plate 30 away from the mold body and withdraw the core pins 26 from the bores 24 in the mold body. To define the proper axial position of the core pins 26 relative to the mold cavity, a plurality of stop members (not shown) are used to engage the upper surface of the cover 42 to control the aforementioned axial position of the core pins 26.

From FIG. 1 and the above discussion of the environment in which the invention operates, it should be apparent that the relative rotative position of the core pin 26 must be precisely maintained, otherwise the ends 28 will not properly coincide with or conform to the surface of the mold cavity 22. In FIGS. 2 and 3 there is illustrated the novel insert 40 of the present invention and how said insert cooperates with a headed core pin and the counterbored portion of the core pin receiving passageway to fix the position of the core pin relative to the core-pin plate.

As was discussed previously, the core-pin plate 30 is provided with a passageway 32 having a counterbore 34. Passageway 32 is aligned with the core 24 in the mold body and is sized to slidably receive the core pin 26, while the counterbore 34 is sized to receive the enlarged head portion 38 of the core pin. The insert 40 is comprised of an angular disc-like portion 42 of generally toroidal configuration which defines an inner aperture 44. The outer diameter of the disc-like portion 42 is slightly larger than the diameter of the counterbore 34, while the aperture 44 corresponds substantially to the core pin receiving passageway 32. On one side or surface of the disc-like portion 42 there is formed a protuberance or a projection 46. Projection 46 of the illustrated embodiment is chordal in shape in that it is defined by a chord-like abutment wall 48 and an arcuate peripheral wall 50, which corresponds in shape to the outer diameter of the annular disc-like portion 42.

In practice, the insert 40 is positioned and secured to the core-pin plate 30 by a force fit within the counterbore 34 and seating the lower surface thereof on the shoulder 33 defined by said counterbore 34. Preferably, the proper rotative position of the insert relative to the core plate 30 is selected prior to positioning, but it is possible once the insert 40 has been engaged in the counterbore to rotate the insert relative to the core pin plate 30 to achieve proper positioning.

After the insert 40 has been properly positioned in the counterbore 34, the headed core pin 26 may then be disposed therein with the relatively flat abutment surface 52 formed on the enlarged headed portion in juxtaposition with the abutment surface 48 on the insert, as illustrated in FIG. 2. Once properly positioned, as shown in FIG. 2, the core pin 26 will not rotate relative to the core pin plate 30.

If desired, the disc-like portion 42 and the projection 46 which define the insert 40, may be provided with longitudinal serrations 54 formed on the outer peripheral surface thereof. The serrations 54 facilitate the force fitting of the insert 40 in the counterbore 34 and will tend to resist inadvertent rotation of the insert 40 relative to the counterbore 34.

In FIGS. 4-6 there is illustrated a toll, designated generally 60, for use in positioning the insert 40 in the counterbore 34, and further how said tool is disengaged after disposition of the insert 40 in the counterbore is affected.

Tool 60 includes an elongated stem portion 62 which is sized to be easily received in the core pin passageway 32 and is adapted to have the insert 40 disposed thereover. Contiguous with the stem portion 62 is a first enlarged portion 64 which is sized to be received in the counterbores 34. The juncture of the stem 62 and the enlarged portion 64 defines a transverse shoulder 66 against which the annular dic-like portion 42 of the insert 40 is abutted when said insert is positioned on said tool.

Since it is not only desired, but necessary, for proper installation of the insert that it be prevented from rotation relative to the tool during force fitting into the counterbores 34, the enlarged portion 64 is provided with abutment means to prevent rotation of the insert relative to said tool. As seen in FIG. 4, a section of the enlarged portion 64, corresponding in shape to the projection 46, has been machined away or removed to define an abutment surface 68. Accordingly, the insert 40 may be disposed over the elongated stem 62 and moved axially into abutting contact with the shoulder 66, with the projection 46 received in the removed or relieved area of the enlarged portion 64 and the corresponding flat abutment surfaces 68 and 48 in engagement to prevent rotation.

Attention is directed to FIG. 5 which illustrates the positioning of the insert 40 on the tool just prior to disposition of the insert in the counterbore 34. In addition to the first enlarged portion 64 the tool 60 is provided with a second enlarged portion 70 spaced therefrom. Between the two enlarged portions 64 and 70 there is provided a threaded portion 72 upon which is engaged a collar 74 provided with an internally threaded annular flange 76 on one end thereof. The outer peripheral surface of collar 74 is provided with a plurality of wrench engaging means to facilitate the turning thereof; the illustrated embodiment using a series of bores 80 adapted to be engaged by a spanner wrench (not shown). The function and purpose of collar 74 will be detailed hereinafter.

In FIG. 5 the insert 40 is illustrated positioned on the tool 60 immediately prior to disposition in the counterbore 34. Prior to disposition of the insert in the counterbore 34, the collar 74 must be retracted to a point considerably above the insert 40. Next, the stem 62 is disposed in passageway 32, thus properly positioning the insert 40 with respect to the axis of the counterbore 34. After the proper rotative position of the insert 40 is determined by use of indicia or some other means on the core-pin plate, the mold maker merely need strike the upper surface of the second enlarged portion 70 to drive and force fit the insert 40 within the counterbore 34. The insert 40 will bottom on the shoulder 33 defined by the counterbore 34 and the passageway 32. The grooves or serrations 54 on the outer surface of the insert 40 will aid in the force fitting operation and will be effective to prevent undesirable inadvertent rotation of the insert 40 relative to the counterbore 34 after said insert has been properly positioned therein.

While the tool 60 effects fast and efficient securement of the insert 40 in the counterbore 34 to save production time in keying the core pins to the core-pin plate, on some occasions the compressive stresses set up during force fitting have a tendency to bind the insert 40 to the tool 60. It is in this regrad that the collar 74 is used, namely, to free the tool 60 from the insert 40 without disrupting the position of the insert 40 relative to the core-pin plate 30.

FIG. 6 illustrates the operation of the collar 74 and how it is utilized to effect disengagement of the tool 60. After the insert 40 (partially visiable in section due to the broken away portion of the core-pin plate 30), is seated in the counterbore 32 with the top of the projection of protuberance 46 being positioned flush with the upper surface of the core-pin plate 30, the collar 74 is rotated in the direction indicated to bring the end surface thereof into engagement with the core-pin plate 30. At this point a spanner wrench (not shown) or some other type of tool, depending upon the type of wrench engaging surfaces used on the collar 74, is engaged about the collar. Due to the engagement of the abutment surface 68 with the abutment surface 48 on the insert, the tool is non-rotatably engaged with the insert 40, accordingly, continued rotation of the collar 74 will effect an axially upward movement of the remaining portion of the tool 60 and this is sufficient to overcome any binding due to the compressive engagement of the insert 40. Of course, the strength of the force fit between the insert 40 and the counterbore 34 must be sufficient to withstand any torque set up during the removal operation.

The illustrated embodiment of the invention has been described in detail for purposes of clarity and understanding, and it is envisioned that various changes and modifications may be practiced upon the structure illustrated without departing from the spirit and scope of the invention, which is defined by the appended claims.

I claim:

1. In combination, an ejector pin having an enlarged headed portion with abutment surface formed thereon, said ejector pin adapted to be disposed in a counterbored passageway formed in a ejector-pin plate, and means to fix the rotative position of said ejector pin relative to said ejector-pin plate, said means comprising an annular insert adapted to be disposed in the counterbored portion of the ejector-pin plate passageway, said annular insert having an outer diameter slightly larger than said counterbore and an inner diameter at least equal to the diameter of said passageway, said insert having an abutment surface formed thereon corresponding in shape to the abutment surface formed on said enlarged headed portion whereby when said ejector pin and said insert are disposed in said counterbored passageway said abutment surfaces are adapted to be placed in engagement to fix the rotative position of said ejector pin with respect to said ejector-pin plate.

2. The combination as defined in claim 1 wherein said insert includes an annular disc portion having an axially extending projection formed thereon, said abutment surface being formed on said axially extending projection.

3. The combination as defined in claim 2 wherein said projection is a chord formation with said abutment surface defining the chordal face thereof.

4. The combination as defined in claim 3 wherein the chord projection includes an outer arcuate peripheral portion corresponding to the outer diameter of said annular disc member.

5. The combination as defined in claim 4 wherein the outer peripheral surface of said annular disc-like member and said chord portion are provided with serrations to facilitate disposition of said insert in said counterbore.

6. The combination as defined in claim 1 which further includes a mold body having a bore for receiving the ejector pin therethrough, said mold body having an arcurate mold surface to which said bore opens, said ejector pin having an end surface conforming to said arcurate mold surface.

References Cited
UNITED STATES PATENTS

| | | | |
|---|---|---|---|
| 294,900 | 3/1884 | Moore | 151—44 |
| 785,919 | 3/1905 | Robertson | 151—44 |
| 1,084,566 | 1/1914 | Strietelmeier | 151—44 X |
| 1,432,243 | 10/1922 | Harris. | |
| 1,580,015 | 4/1926 | Clark | 151—44 |
| 1,778,642 | 10/1930 | O'Neil | 151—44 X |
| 2,511,350 | 6/1950 | Kosobud | 249—205 |
| 2,512,379 | 6/1950 | Quarnstrom | 249—205 |
| 2,645,815 | 7/1953 | Quarnstrom | 249—205 |
| 2,834,989 | 5/1958 | Kusnery | 249—68 |
| 2,837,796 | 6/1958 | Aliberti | 249—68 |
| 3,403,883 | 10/1968 | Simko | 249—66 |

J. HOWARD FLINT, Jr., Primary Examiner

U.S. Cl. X.R.

249—205; 287—20.5